United States Patent [19]

Rasmussen et al.

[11] Patent Number: 4,653,094
[45] Date of Patent: Mar. 24, 1987

[54] TELEPHONE SET LINE STATUS DISPLAY

[76] Inventors: Harry R. Rasmussen, 2215 Jovita Blvd. NE., Puyallup, Wash. 98371; Dan M. Percival, 21620 210 Ave. SE., Maple Valley, Wash. 98038; John D. Hoskinson, 12824 Prairie Cir. E., Summer, Wash. 98390; Charles Nickerson, 14338 Sandy Hook Rd. NE., Poulsbo, Wash. 98370

[21] Appl. No.: 713,775

[22] Filed: Mar. 19, 1985

[51] Int. Cl.⁴ .............................................. H04M 1/00
[52] U.S. Cl. ..................................... 379/396; 379/376; 340/705; 340/716
[58] Field of Search ................. 179/81 C, 84 L, 84 C, 179/99 LS; 340/716, 784, 765, 705

[56] References Cited

U.S. PATENT DOCUMENTS

| | | | |
|---|---|---|---|
| 4,132,860 | 1/1979 | Rasmussen | 179/99 |
| 4,228,324 | 10/1980 | Rasmussen et al. | 179/99 |
| 4,323,734 | 4/1982 | Kimzey | 179/18 |
| 4,352,959 | 10/1982 | Warnecke et al. | 179/81 L X |
| 4,514,920 | 5/1985 | Shafrir et al. | 340/716 X |

*Primary Examiner*—James L. Dwyer
*Attorney, Agent, or Firm*—Delbert J. Barnard

[57] ABSTRACT

An LCD is associated with each phone line. The LCD is powered by the system current in the phone line. When the phone (10) is in an "on-hook" condition, the LCD is energized and it displays a light image of a telephone in an on-hook condition on a solid dark background. When the phone (10) is in an off-hook condition the LCD is turned off causing its liquid crystal compound to become transparent. The LCD working displays a solid light color but an image of a handset appears on this background. This handset image is printed onto the back side of the front glass panel of the LCD in the region that appears as a dark background when the LCD is energized. When a ring is received by the line the LCD flashes back and forth between the two displays at a fast rate. When the line is "on-hold" the LCD flashes between the images at a slower rate.

14 Claims, 6 Drawing Figures

TELEPHONE SET LINE STATUS DISPLAY

DESCRIPTION

1. Technical Field

This invention relates to telephone station equipment. More particularly, it relates to a particular line status display system for a telephone set that is powered by the telephone line current or an equivalent low level current.

2. Background Art

U.S. Pat. No. 4,132,860, granted Jan. 2, 1979, to Harry R. Rasmussen, relates to a hold control for a key telephone system. The line status display of the present invention is usable with the telephone station equipment disclosed by U.S. Pat. No. 4,132,860, in place of the system of LEDs and the line status display circuitry that are disclosed by that patent.

As shown by U.S. Pat. No. 4,132,860, it is known to associate an LED with each telephone line, and to operate the LED for indicating the status of the line. In such system, and in other known systems, the LED is turned on when the line is in use. It is off when the line is not in use. It is controlled to blink at a slow rate when the line is on hold. It is made to blink at a faster rate in response to an incoming call on the line. In some cases, the LED is powered by a separate power supply.

A principal object of the present invention is to provide a line status display which is capable of being powered by a quite small current, so that the telephone line current can be used to power the display. It is an object of the invention to provide a line status display system which can be powered by less than about five microamps of current.

3. Disclosure of the Invention

In accordance with the invention, a liquid crystal display (LCD) is used to show the status of a telephone line. An LCD is used which includes a display area adapted to display a uniform light color over the area when the LCD is off. The LCD is provided with a transparent panel which is aligned with the display area. a dark color first indicia is provided on the transparent panel. The first indicia is clearly visible when the LCD is off and such dark color first indicia stands out in the display area which otherwise shows the uniform light color produced by the LCD when it is off. The LCD is constructed to display a second indicia on the display area when the LCD is on. The second indicia includes a dark background which extends in to a region which is in alignment with the first indicia. As a result, when the LCD is on the first indicia cannot be seen because it appears to be a part of the dark background of the second indicia.

The control circuit for the LCD includes control means connecting the LCD to a low current source within the telephone set so that the LCD is powered by the low current source. The control means is responsive to conditions of the telephone line, so that in response to a first condition of the telephone line, the LCD is on and the second indicia is displayed. In response to a second condition of the telephone line the LCD is off and the first indicia is displayed.

In preferred form, the low current source is the line current of the telephone line.

In accordance with an aspect of the invention, the control means indicia means for switching the LCD back and forth at a first rate in response to a third condition of the line. Another aspect of the invention is to provide a control means which switches the LCD from one indicia to another at a faster rate in response to a fourth condition of the telephone line.

In preferred form the first indicia which is located on the transparent panel is displayed when the LCD is off and the second indicia is displayed when the LCD is on.

In the preferred embodiment, a relatively high voltage condition of the telephone line when the telephone is in an on-hook condition is used for powering the LCD to display the second indicia and said second indicia indicates that the telephone set is in an on-hook condition. The LCD is turned off in response to a drop in the telephone line voltage when the telephone is in an off-hook condition and the first indicia is adapted to signal that the telephone is in an off-hook condition.

In preferred form, oscillator means operable in response to the telephone line being in an on-hold condition flashes the display back and forth between the first and second indicia at a relatively slow rate.

The preferred embodiment also includes oscillator means operable in response to an incoming ring to switch the display back and forth between the two indicia at a faster rate.

Other objects, features and advantages of the invention are stated in, and evident from, the description of the preferred embodiment which is also the best mode of the invention. The description of the best mode of the embodiment and the appended claims also constitute portions of the disclosure of the invention.

BRIEF DESCRIPTION OF THE DRAWINGS

In the drawing, like reference numerals denote like parts throughout, and.

BEST MODE FOR CARRYING OUT THE INVENTION

Figure 1:
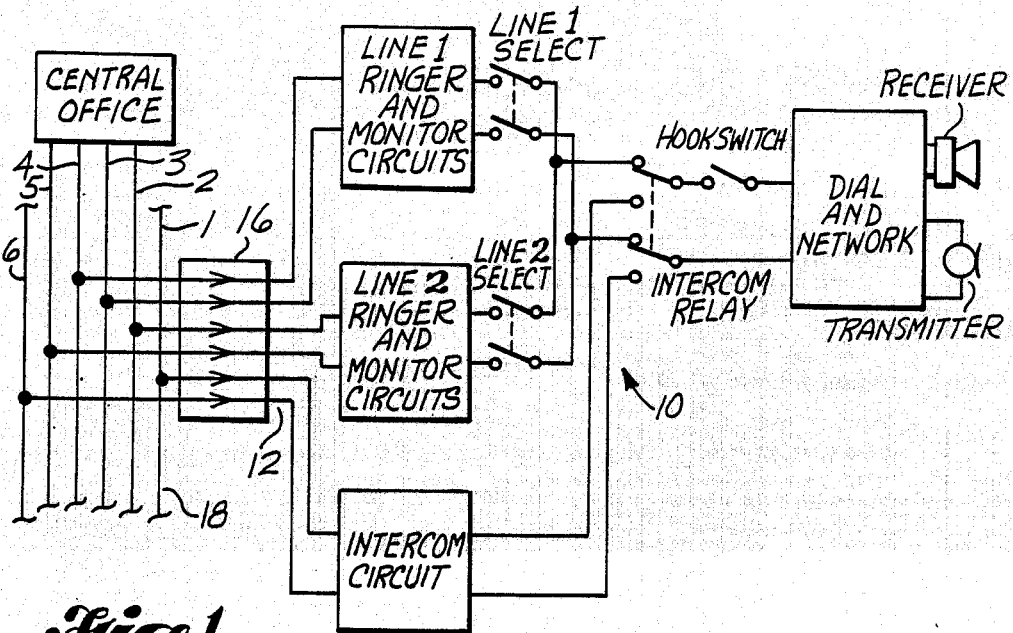
FIG. 1 is a generalized block diagram of a telephone set which includes an embodiment of the invention, shown connected to telephone and intercom communication lines.

By way of typical and therefore nonlimitive example, FIG. 1 shows a telephone set or station 10 of a type having two telephone lines and an intercom system. The telephone set 10 is connected by a six wire modular cord 12 and a modular wall jack 16 to a wiring set 18. Wire pairs 2, 5 and 3, 4 of the wiring set 18 are standard telephone conductor lines which carry central office supervisory signals and telephone voice signals between a central office and the telephone set. Wires 1 and 6 are dedicated parts of an intercom circuit. The intercom circuits is not a part of the present invention but rather is a part of a copending application Ser. No. 714,182, filed Mar. 19, 1985, by Harry R. Rasmussen, Charles Nickerson and Dan M. Percival, and entitled "On Premises Page Intercom System Utilizing Telephone Set Components." Reference is made to such copending application for a description of the intercom circuit.

This application, the said copending application Ser. No. 714.182, and the aforementioned U.S. Pat. No. 4,132,860 are all owned by the same assignee.

Figure 2:
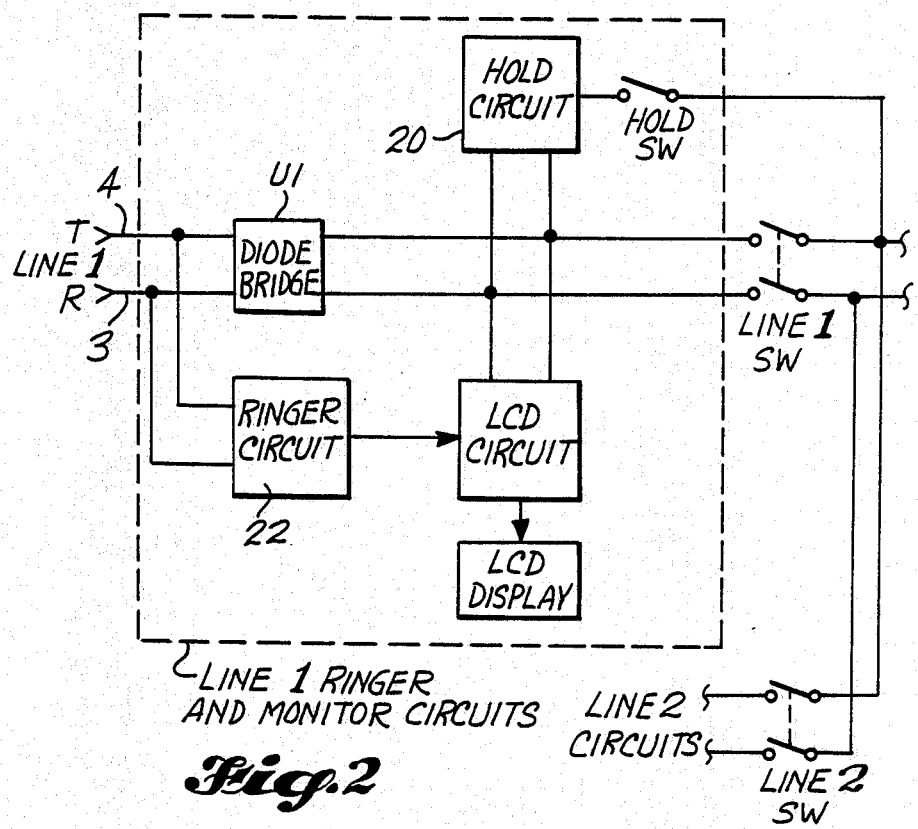
FIG. 2 is an enlarged scale block diagram of the ringer and monitor circuit portion of FIG. 1, for line one.

FIG. 2 is an enlarged scale view of the ringer and monitor circuits for line one. The pair of lines used for telephone conversations routed through the central office are commonly referred to as "tip" and "ring" lines. In FIG. 2 the tip line is designated T and the ring line is designated R.

Reference is made to the aforementioned U.S. Pat. No. 4,132,860 for a disclosure of typical emobodiments of the hold circuit 20. Ringer circuit 22 is a standard electronic telephone ringer circuit.

Figure 3:
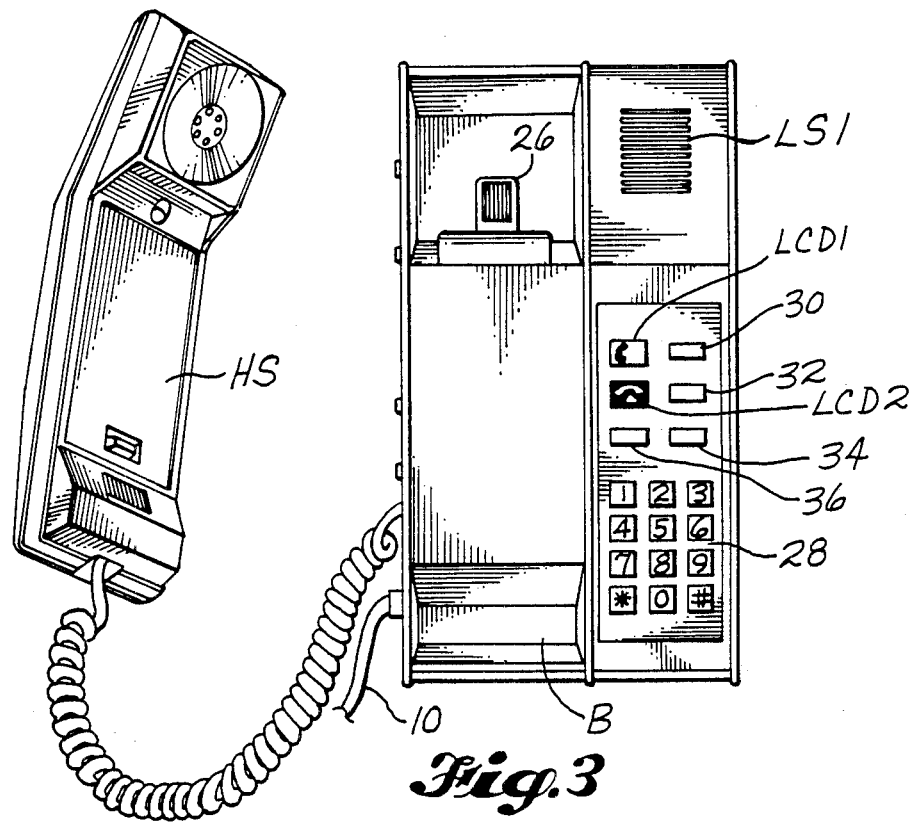
FIG. 3 is a pictorial view of a typical telephone set, such view showing the handset of the telephone set lifted up from and spaced away from the base of the telephone set.

Referring to FIG. 3, the telephone set 10 is shown to comprise a base B and a handset HS connected to the base B by a cord 24. A hook switch is designated 26. When the handset HS is on the base B ("on-hook condition of the telephone), the switch button is depressed and the switch 26 is open. Whenever the handset HS is lifted up off the base B ("off-hook" condition), the switch 26 is closed.

A speaker LS 1 is provided within the base B. It is a part of the intercom system.

In the illustrated embodiment the dial button set 28 is incorporated into the base B. The base B is also provided with line select buttons 30, 32, a hold button 34 and an intercom button 36. In accordance with the present invention, a separate liquid crystal display (LCD) is associated with each line select button 30, 32. LCD 1 is associated with line one and button 30. LCD 2 is associated with line two and button 32.

Figure 4:
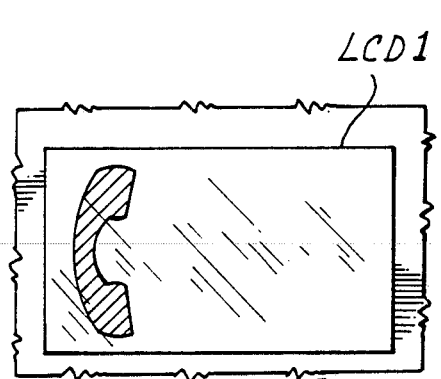
FIG. 4 is an enlarged scale view of an LCD associated with line one, showing an indicia which might appear when the line is in use.
Figure 5:
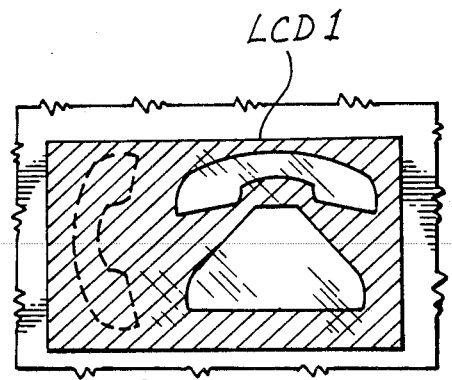
FIG. 5 is a view like FIG. 4, but showing a second indicia which may appear when the line is inactive or not in use.

FIGS. 4 and 5 are enlarged scale views of the display of LCD 1. FIG. 4 shows how the display appears when line one is being used. FIG. 5 shows how the display appears when the hand set HS is on the hook and the line is not being used. Of course, the particular indicia that are shown are merely presented by way of typical example. While the particular indicia that are shown are preferred, either one or both could be changed.

As is known per se, a liquid crystal comprises a pair of spaced apart glass panels having conductive coatings on their inter surfaces and between which a crystal liquid compound is provided in a selected region or regions for defining an image or indicia. When a drive signal is delivered to the LCD the liquid crystal compound becomes opaque and the region(s) occupied by the liquid crystal compound appear dark. When no drive signal is delivered to the LCD, the liquid crystal compound is opaque and allows light to pass through it and be reflected back as a uniform light color. In those regions of a LCD in which the liquid crystal compound has not been provided, the display normally shows the light color whether on or off. The light color is normally silver.

In accordance with an aspect of the present invention, the liquid crystal compound is used to provide a negative display of a telephone set in which the handset is positioned on the base. The telephone set appears as a light color within a dark (e.g. black) background formed by the liquid crystal compound. A glass panel portion of the LCD that is in alignment with the liquid crystal compound is provided with an image of a handset HS by itself. This image or indicia is dark and matches the color that the liquid crystal compound takes when it is energized. As a result, when the current to the LCD is off, and the entire face of the LCD would normally display the light color, the handset indicia appears because it is permanently displayed on a glass panel in a dark color. When the LCD is energized the handset indicia HS becomes invisible because it is indistinguishable from the dark background portion of the energized LCD. Thus, when the LCD is energized the second indicia appears, i.e. the image of a handset set down onto the base of a telephone.

As will hereinafter will be described in greater detail, when the handset HS is in an on-hook condition, an activating signal is delivered to the LCD. It is at this time that the LCD shows the display of a telephone in an on-hook condition (or some other suitable indicia). When the handset is removed from the base B and is connected to a line and put into use, the drive signal to the LCD is turned off and the handset indicia (or other suitable indicia) is displayed. When a given line is put on hold, the display alternates slowly between symbols (e.g. about once a second). In response to an incoming call the display alternates rapidly between the two symbols (e.g. about five time per second).

The normal voltage on the telephone line when it is not in use is forty-eight volts DC. The normal voltage across a telephone set when it is using the line is approximately seven volts DC. When a telephone set of a type disclosed by U.S. Pat. No. 4,132,860 is operated to place a line on hold, the voltage level across the set is modulated between two different levels at a one HZ rate. These levels are approximately nine volts DC and seventeen volts DC.

The different voltage levels cause varying power levels to the LCD circuit. Voltages above approximately thirteen volts CD causes the display to indicate an on-hook position and voltage levels below thirteen volts DC will cause an off-hook display.

Figure 6:
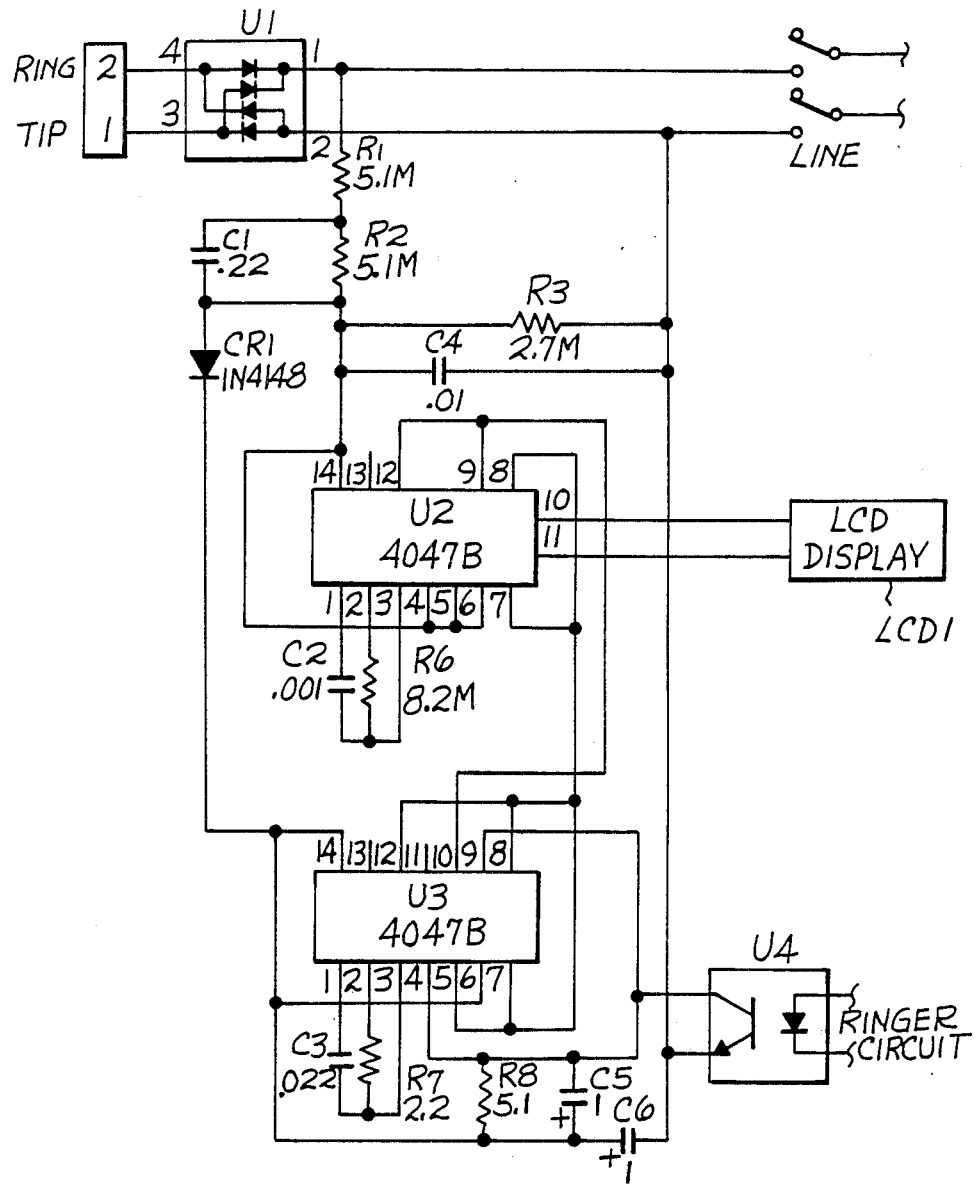
FIG. 6 is a schematic diagram of a preferred form of LCD control.

Referring to FIGS. 6 and 7, the LCD circuit is coupled to the telephone line behind a diode bridge U1 through a large value of resistance R1 and R2. Capacitor C1 couples AC energy around resistor R2 to create a rapid change in the power level of integrated circuit U2 and an AC change in the line voltage. Resistor R3 sets the power level of integrated circuit U2 by bypassing some current. Capacitor C4 filters the power. Diode CR1 allows current to flow to a filter capacitor C6 and to power integrated circuit U3. Diode CR1 blocks the current from flowing back to integrated circuit U2 during AC transition.

Integrated circuit U2 forms a thirty HZ oscillator with timing components R6 and C2. When the line voltage is above thirteen volts DC (approximately), there is enough power delivered to integrated circuit U2 (pin 14), to cause the integrated circuit to oscillate. The output of the oscillator drives the LCD so that it will indicate that the telephone line is in an on-hook condition.

When the line voltage is below thirteen volts DC there is insufficient power delivered to integrated circuit U2 for oscillation to occur. The LCD will not be driven and will return to a light color display state. It is at this time that the indicia provided on a glass panel of the LCD will indicate that the telephone line is in an off-hook condition, or is in use.

Integrated circuit U3 forms a five HZ oscillator with timing components R7 and C3. When the telephone line is in the on-hook condition there is sufficient power delivered to integrated circuit U3 (pin 14), for proper oscillation. Resistor R8 is a pull-up for the disable inputs of integrated circuit U3 (pins 4 and 9). Integrated circuit U4 is an optoisolator whose output transistor is normally not conducting. This causes a high state at the disable inputs (pins 4 and 9) and integrated circuit U3 does not oscillate. The output (pin 10) of integrated circuit U3 leads to the disable inputs of integrated circuits U2 (pins 9 and 12). When integrated circuit U3 (pin 10) is low, and integrated circuit U4 is not conducting, integrated circuit U2 will oscillate.

When the ringer circuit receives a ring, current flows through the diode emitter of integrated circuit U4, causing the phototransistor to conduct. This pulls the voltage at integrated circuit U3 (pins 4 and 9) to a low state and integrated circuit U3 will oscillate at five HZ. The output to integrated circuit U2 will cause integrated circuit U2 to be disabled and enabled. The display will therefore switch between the off-hook and the on-hook condition at a five HZ rate. Capacitor C5 causes a low state to exist at integrated circuit U3 (pins 4 and 9) for approximately five seconds after the ring signal stops and integrated circuit U4 stops conducting.

It may be in some installations desirable to power the LCD circuit of the present invention with some other low current source, such as a battery housed within the telephone set. It is preferred that the LCD circuit be powered by the line current of a telephone line, but there would still be an economic advantage to be had over prior systems if a battery were to be used. An LCD is relatively low cost, uses low power and has a high performance. It also can be operated on the same battery for a substantially long length of time. Thus, battery use is definitely economically feasible. If a battery were to be used, the above-mentioned indicia conditions could be reversed by a simple change in circuitry. In other words, the circuit that has been discribed could be used for operating switches in a circuit leading from the battery to the LCD, so that the LCD would be off during an on-hook condition and on during an off-hook condition. In such case, a different and more suitable indicia selection would be used. By way of example only, the display of a telephone in an on-hook condition could be placed on the glass and the display of the handset produced by use of the liquid crystal compound.

In either embodiment, the display that is affixed to the glass can be done so by screen printing.

It will be readily apparent to a person skilled in the art that numerous other changes and modifications may be made to the embodiment without departing from the spirit of the invention. For example, if an equivalent display device to a LCD is developed, which can operate on low power, such a display could be substituted for the LCD in a system of the present invention and such a substitution would be within the scope of the invention. For example a multi-segment display could be used instead of a single segment with a screen printing to obtain image changes.

What is claimed is:

1. In a telephone set, display apparatus for displaying the use status of a telephone line, comprising:
    a liquid crystal display (LCD) means associated with the line, said LCD means including a display area which displays a uniform light color when the LCD means is off, said LCD means including a transparent panel aligned with said display area on to which a dark color first indicia has been placed, such first indicia being clearly visible when the LCD means is off, and said LCD means displaying a second light color indicia on said display area when on, said second indicia including a dark background for said second indicia which extends into a region which is in alignment with the first indicia, so that when the LCD means is on, the second indicia is visible and the first indicia cannot be seen because it appears to be a part of the dark background of the second indicia; and
    control means connecting the LCD means to a low current source within the telephone line so that the LCD means is powered by such current source, said control means being responsive to a condition of the telephone line, so that in response to first condition of the telepone line, the LCD means is on and the second indicia is displayed, and in response to a second condition of the telephone line the LCD means is off and the first indicia is displayed.

2. A telephone set according to claim 1, wherein the low current source is the telephone line current.

3. A telephone set according to claim 2, wherein the control means includes oscillator means for powering the LCD and a large value of resistance to limit the current delivered to the oscillator means.

4. A telephone set according to claim 3, wherein the LCD means is powered by the oscillator means when the telephone set is in an "on-hook" condition, and the power for the oscillator means comes through said large value of resistance and provides a supply voltage to the control means of sufficient value for proper oscillation.

5. A telephone set according to claim 4, wherein the telephone line is off a type in which the voltage level is reduced when the telephone set enter an off-hook condition, and said reduced voltage level reduces the current through the isolated resistance to the LCD circuit, and this results in the supply voltage to the oscillator means being reduced below the value required for proper oscillation, resulting in the LCD means being turned off and the first indicia being displayed.

6. A telephone set according to claim 5, wherein the LCD circuit means includes means responsive to the telephone line being placed in a hold condition, for modulating the voltage level between the level in which the LCD means is on and the level in which the LCD means is off, at a first rate of modulation, resulting in the LCD means displaying the first indicia when it is off and the second indicia when it is on.

7. A telephone set according to claim 6, wherein the LCD circuit includes means for detecting the presence of an incoming ring to the telephone set, and means causing the LCD means to be turned on and off in response to the incoming ring signal at a rate that is different than the on-off rate established by a hold condition of the telephone set.

8. A telephone set according to claim 1, wherein the low current source is the telephone line current, and said control means turns the LCD on when the telephone is in an on-hook condition and turns the LCD off when the telephone is in an off-hook condition.

9. A telephone set according to claim 8, wherein said telephone set includes a hold circuit means and said control means for the LCD includes means responsive to the telephone line being placed in a hold condition, for turning the LCD means on and off at a first rate of modulation, resulting in the LCD means displaying the first indicia when it is off and the second indicia when it is on.

10. A telephone set according to claim 9, wherein the telephone set includes ringing circuit means and the control means for the LCD includes means for detecting the presence of an incoming ring to the telephone set to the ringing circuit means, and means causing the LCD means to be turned on and off in response to the incoming ring signal at a rate which is different than the on/off rate established by a hold condition of the telephone set.

11. A telephone set according to claim 8, wherein the telephone set includes ringing circuit means and the control means for the LCD includes means for detecting the presence of an incoming ring to the telephone set to the ringing circuit means, and means causing the LCD means to be turned on and off in response to the incoming ring signal at a rate which is different than the on/off rate established by a hold condition of the telephone set.

12. A telephone set according to claim 1, wherein said telephone set includes a hold circuit means and said control means for the LCD includes means responsive to the telephone line being placed in a hold condition, for turning the LCD means on and off at a first rate of modulation, resulting in the LCD means displaying the first indicia when it is off and the second indicia when it is on.

13. A telephone set according to claim 12, wherein the telephone set includes ringing circuit means and the control means for the LCD includes means for detecting the presence of an incoming ring to the telephone set to the ringing circuit means, and means causing the LCD means to be turned on and off in response to the incoming ring signal at a rate which is different than the on/off rate established by a hold condition of the telephone set.

14. A telephone set according to claim 1, wherein the telephone set includes ringing circuit means and the control means for the LCD includes means for detecting the presence of an incoming ring to the telephone set to the ringing circuit means, and means causing the LCD means to be turned on and off in response to the incoming ring signal.

* * * * *